US009273596B2

(12) United States Patent
Tracey

(10) Patent No.: US 9,273,596 B2
(45) Date of Patent: Mar. 1, 2016

(54) BOOST EXTRACTION METHOD OF SECONDARY AIR INJECTION FOR INTERNAL COMBUSTION ENGINE EMISSION CONTROL

(75) Inventor: Timothy D. Tracey, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 142 days.

(21) Appl. No.: 13/297,748

(22) Filed: Nov. 16, 2011

(65) Prior Publication Data
US 2013/0118151 A1 May 16, 2013

(51) Int. Cl.
F01N 3/00 (2006.01)
F02B 37/16 (2006.01)
F02M 35/10 (2006.01)

(52) U.S. Cl.
CPC .......... F02B 37/16 (2013.01); F02M 35/10229 (2013.01); Y02T 10/144 (2013.01)

(58) Field of Classification Search
CPC .. F02B 37/16; F02M 35/10229; Y02T 10/144
USPC ................... 60/272–324; 123/568.15, 568.19
See application file for complete search history.

(56) References Cited

U.S. PATENT DOCUMENTS

| 4,215,550 | A |   | 8/1980  | Dinger et al.       |
| 4,406,126 | A |   | 9/1983  | Yokokura et al.     |
| 5,560,199 | A | * | 10/1996 | Agustin et al. ............ 60/274 |
| 5,706,790 | A |   | 1/1998  | Kemmler et al.      |
| 5,974,792 | A |   | 11/1999 | Isobe               |
| 6,427,639 | B1 |   | 8/2002  | Andrews et al.      |
| 6,546,908 | B1 |   | 4/2003  | Pekau               |
| 6,817,173 | B2 | * | 11/2004 | Paffrath et al. ............ 60/293 |
| 7,155,899 | B2 |   | 1/2007  | Beer et al.         |
| 7,451,597 | B2 |   | 11/2008 | Kojima et al.       |
| 7,588,368 | B2 | * | 9/2009  | Hagen et al. ............ 374/40 |
| 7,748,976 | B2 |   | 7/2010  | Burrahm et al.      |
| 8,307,649 | B2 | * | 11/2012 | Axelsson et al. ............ 60/612 |
| 2004/0139740 | A1 |   | 7/2004  | Burk                |
| 2009/0158714 | A1 | * | 6/2009  | Hermansson et al. ............ 60/286 |
| 2010/0000204 | A1 |   | 1/2010  | Hemsley             |
| 2010/0139267 | A1 | * | 6/2010  | Schliesche et al. ............ 60/602 |

(Continued)

FOREIGN PATENT DOCUMENTS

| DE | 4139291 | 6/1993 |
| EP | 1300558 | 4/2003 |
| JP | 7332072 | 12/1995 |

Primary Examiner — Jesse Bogue
Assistant Examiner — Kelsey Stanek
(74) Attorney, Agent, or Firm — Snell & Wilmer LLP

(57) ABSTRACT

A secondary air injection system to aid in the warm-up of a catalyst employed as part of an emissions control system of a vehicle to obtain efficient reduction in engine emissions. A compressor utilized to compress or boost air for increased engine performance is additionally used as a secondary air injection source, eliminating the need for external air pumps. The compressor is configured to transmit boosted air to the engine of the vehicle or to the catalyst to aid in the warm-up of the catalyst. A valve having an open configuration and a closed configuration controls the passage of the boosted air to the engine or to the catalyst. The valve may be controlled by a controller based upon airflow, temperature, pressure, or time. A control map relating engine speed to airflow may be used for obtaining airflow values for controlling the configuration of the valve.

15 Claims, 5 Drawing Sheets

(56) References Cited

U.S. PATENT DOCUMENTS

| | | |
|---|---|---|
| 2010/0263639 A1 | 10/2010 | Uhrich et al. |
| 2010/0296949 A1* | 11/2010 | Corley .......................... 417/279 |
| 2011/0168143 A1* | 7/2011 | VanDerWege et al. .. 123/568.15 |
| 2012/0042630 A1* | 2/2012 | Pekrul et al. .................... 60/273 |

* cited by examiner

BOOST EXTRACTION METHOD OF SECONDARY AIR INJECTION FOR INTERNAL COMBUSTION ENGINE EMISSION CONTROL

BACKGROUND

1. Field

The present invention relates generally to improvements in engine emissions control systems and more particularly pertains to the reduction of engine emissions in automobiles using secondary air injection to aid a vehicle catalyst system during warm-up.

2. Description of the Related Art

Automobiles and other vehicles commonly incorporate an internal combustion engine for providing power to operate their various functions. An unfortunate side effect of the power producing capability of internal combustion engines is the production of exhaust gases containing a variety of harmful or toxic elements. After combustion of an air/fuel mixture in the cylinders of the engine during the power stroke, unspent fuel in the air/fuel mixture is passed out of the engine cylinders and commonly flowed along an exhaust pipe of the automobile. This waste or exhaust gas is then expelled from the exhaust pipe and away from the vehicle into the surrounding environment. These exhaust gases are known to cause a variety of dangerous ailments if inhaled in significant quantities by humans or other mammals and the proliferation of automobiles as the most prevalent means of transportation has made such engine emissions of particular concern. In an effort to help reduce the toxicity of these exhaust gases before their delivery into the environment surrounding the vehicle, emissions control systems aboard these vehicles have been developed in an attempt to eliminate harmful particulates from the exhaust gas via chemical processes before the exhaust gas is permitted to exit the exhaust pipe.

Typically, automobile manufacturers will incorporate a catalyst device as part of the emissions control system through which the exhaust gas is flowed at some location along the exhaust pipe. In order to operate most efficiently at removing the harmful or toxic components of the exhaust gas, the catalyst must be warmed up to a sufficient temperature, oftentimes higher than it normally would exist under ambient conditions. This warm-up is particularly important upon a cold start of the engine and has been accomplished through secondary air injection by incorporating additional external air pumps and associated valves/plumbing onto the vehicle. Such a system directs excess air into the exhaust pipe upstream of the catalyst for aiding in the immediate warm-up of the catalyst, such as during initial vehicle turn-on when the engine is at idle and when there exists a more limited amount of exhaust gas flowing through the exhaust pipe from the internal combustion engine.

However, the reliance upon secondary air injection systems utilizing external air pumps and plumbing increases the cost and complexity of an automobile's power train design. Not only do the additional components add to the overall engineering design cost of an automobile, but also increase the manufacturing cost of every vehicle constructed. Moreover, the addition of supplementary mechanical components onto the vehicle increases the potential for malfunction and adds to the number of parts that may require servicing or repair by an owner of the vehicle. External pumps pose durability issues and may have difficulty surviving the environmental elements encountered by many automobiles, for example, by freezing up in cold or icy temperatures. Furthermore, certain U.S. states require owners to have their vehicles regularly "smog" checked to ensure that the emissions control systems onboard those vehicles are operating effectively in conformance with predetermined environment standards. Particularly in the current environmental climate where an increased emphasis is placed upon clean power generation and the reduction of toxic engine by-products, a system for reducing engine emissions without the reliability problems outlined above is even more desirable.

SUMMARY

The present invention may provide various improvements over conventional secondary air injection emissions control systems. For example, the present invention may provide an emissions control system that utilizes a compressor on vehicles that had previously been used only for engine power generation, thus eliminating the need for additional external pumps. The present invention may also provide an emissions control system that operates based upon air flow from a compressor to a catalyst, thus providing an accurate means of controlling the emissions control system.

In one embodiment, the present invention may provide a secondary air injection system having an engine and a catalyst coupled with the engine, the catalyst configured to receive exhaust air from the engine. A compressor is coupled with the engine and is configured to output compressed air. A valve is coupled with the compressor and the catalyst, the valve having a first configuration for allowing transmittal of at least some of the compressed air output by the compressor to the catalyst and a second configuration for preventing transmittal of the compressed air output by the compressor to the catalyst, the valve configured to change from the first configuration to the second configuration based upon a flow rate of at least some of the compressed air.

In another embodiment, the present invention may provide a secondary air injection system having an internal combustion engine, a catalyst connected with the internal combustion engine and configured to receive exhaust air from the internal combustion engine, and a compressor connected with the internal combustion engine and configured to output compressed air. An intake air box is connected with the compressor. A valve is connected with the compressor and the catalyst, the valve having an open configuration for passing all of the compressed air from the compressor to the catalyst and a closed configuration for blocking the passage of the compressed air from the compressor to the catalyst. A controller is connected with the valve and is configured to switch the valve between the open configuration and the closed configuration.

In yet another embodiment, the present invention may be a method of secondary air injection for emission control of an automobile having an engine, a catalyst coupled with the engine and a compressor coupled with the engine and the catalyst. The method may include opening a valve for passing air from the compressor to the catalyst, determining a flow of air passing from the compressor to the catalyst, and closing the valve for blocking passage of air from the compressor to the catalyst based upon the flow of air passing from the compressor to the catalyst.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
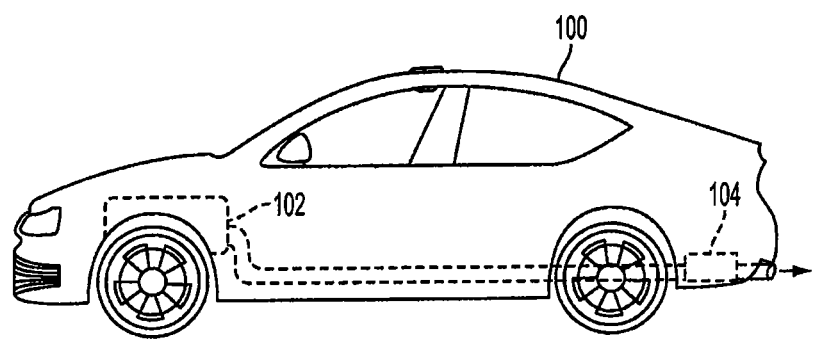
FIG. 1 is a side view of a vehicle incorporating a catalyst system for reducing engine emissions according to an embodiment of the present invention.

Referring to FIG. 1, a vehicle 100 is shown and includes an engine 102 connected to a catalyst 104. The vehicle 100 may be an automobile as shown, or may be any other type of motorized vehicle that incorporates an engine, such as a truck, a boat, a tractor, an ATV, etc. The engine 102 generates power for the vehicle 100 by combusting air and fuel. Any remaining waste or exhaust gas in the engine 102 after combustion is subsequently transmitted away from the engine 102 and to the catalyst 104 in order for the waste or exhaust gas to be cleaned of its harmful elements or compounds. As the waste or exhaust gas passes through the catalyst 104, the toxicity of the gas is reduced before the gas is expelled away the vehicle 100. Thus, a significant reduction in engine emissions is achieved through the use of the catalyst 104 when compared against directly expelling the waste or exhaust gas from the engine 102 and away from the vehicle 100 without the catalyst 104.

Figure 2:
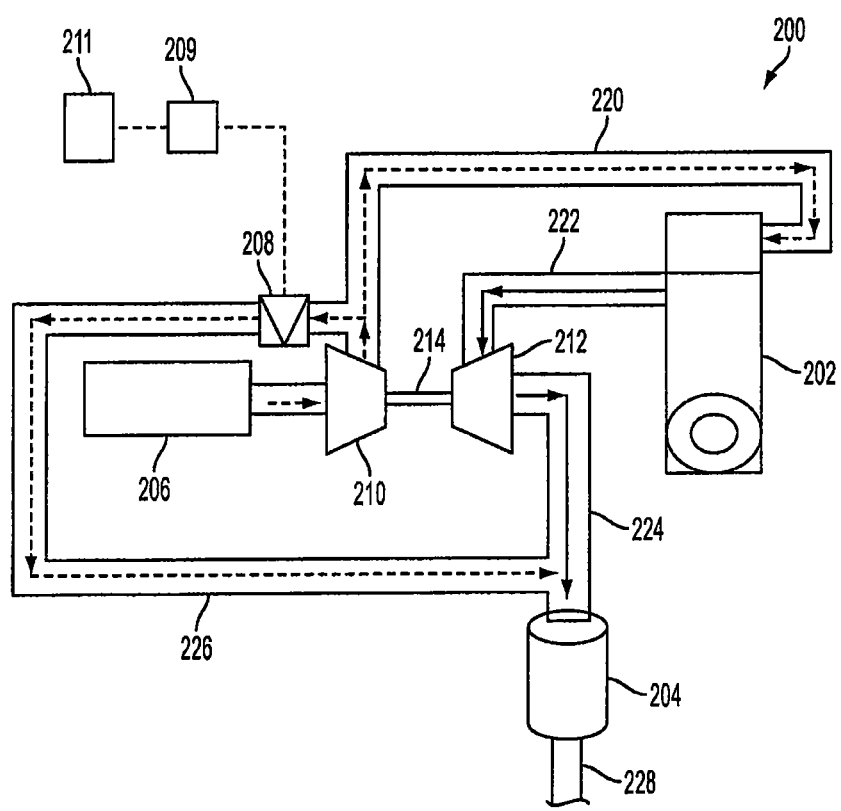
FIG. 2 is a system diagram of turbocharger boost extraction for secondary air injection according to an embodiment of the present invention.

Turning next to FIG. 2, a system diagram 200 is shown for extracting boosted air from a turbocharger unit for warming up a vehicle catalyst system in order to more efficiently reduce the engine emissions. The system diagram 200 shows an engine 202 and a turbocharger unit comprising a compressor 210, a turbine 212 and a mechanical link 214. The engine 202 is connected with the turbine 212 of the turbocharger unit via a first exhaust path 222. After the combustion of an air/fuel mixture within the engine 202, the waste or exhaust gas from the engine 202 travels along the first exhaust path 222, is received by the turbine 212 and operates to spin or otherwise exhibit a force upon one or more components of the turbine 212. The turbine 212 is connected to the compressor 210 of the turbocharger unit via the mechanical link 214 such that the mechanical link 214 transmits a force to the compressor 210 for powering the compressor 210 when the turbine 212 is acted upon by the waste or exhaust gas from the engine 202.

After passing through the turbine 212 of the turbocharger unit, the waste or exhaust gas from the engine 202 is transmitted along a second exhaust path 224 to a catalyst 204 for the removal of toxic chemicals or other particulates in the waste or exhaust gas before the waste or exhaust gas is expelled away from a vehicle. Since the catalyst 204 may operate more efficiently at warmer temperatures, secondary air injection from the boosted air exiting the compressor 210 of the turbocharger unit is also transmitted to the catalyst 204, as described in greater detail below. After passing through the catalyst 204, the waste or exhaust gas is transmitted along a third exhaust path 228 where it may be expelled away from the vehicle with significantly reduced engine emissions.

An engine intake air box 206, located, for example, in an engine bay of the vehicle, is connected to the compressor 210 of the turbocharger unit and provides a source of air to the compressor to be compressed or boosted. The compressor 210 receives air from the engine intake air box 206 and outputs compressed or boosted air for transmittal to the engine 202 along an intake path 220 and may provide the engine 202 with increased power generation capabilities when compared to a supply of non-boosted air. The compressed or boosted air allows increased volumes of a combustible air/fuel mixture to be contained within the cylinders of the engine 202, thus allowing for more powerful combustion strokes. In addition to the increased engine performance obtained through the use of the turbocharger unit, the boosted air output from the compressor 210 may also be supplied to the catalyst 204 as a form of secondary air injection via a supplementary exhaust path 226. Such secondary air injection can aid in the warm-up of the catalyst 204 for more efficient engine emissions reduction. The boosted air may be sent to the engine 202 and the catalyst 204 simultaneously, or the boosted air may only be sent to either the engine 202 or the catalyst 204 at a given moment in time. The supplementary exhaust path 226 may be routed near portions of the vehicle or engine bay that generate heat (e.g., adjacent the engine 202) in order to increase the temperature of air flowing through the supplementary exhaust path 226 and thus further aid in warm-up of the catalyst 204.

By utilizing the turbocharger unit on the vehicle to provide the secondary air injection for the warm-up of the catalyst 204, additional external air pumps and their associated plumbing or valves are no longer required. Moreover, the boosted air may exhibit higher heat, above its ambient temperature, by virtue of its compression by the compressor 210, thus providing improved heating of the catalyst 204 when compared against merely the injection of ambient air from external air pumps. The dual role of the compressor 210 of the turbocharger unit thus reduces engine part count and overall power train cost. Furthermore, in certain embodiments, the compressor 210 may be configured to only supply the catalyst with boosted air at engine start-up at a low compression rate, thus allowing an opportunity for oil to heat up and flow through portions of the turbocharger unit during less strenuous operation prior to the compressor 210 being fully utilized for engine 202 performance.

A valve 208 is positioned at a location along or connected to the intake path 220 of the boosted air stream. In one embodiment, the valve 208 may be constructed or positioned within or as part of a housing of the compressor 210. The valve 208 may have an open configuration and a closed configuration. A controller 209 is connected to the valve 208, either via a wired connection or wirelessly, for controlling the configuration of the valve 208, as discussed in more detail herein and/or by the flowcharts shown in FIGS. 4A-5. Alternative control logic may be utilized by the controller 209 in an alternative embodiment, for example, the configuration of the valve 208 may be time-based or manually set. The controller may be any type of hardware or circuit capable of controlling the configuration of the valve, for example, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In one embodiment, the controller 209 may be an engine control unit of the vehicle. The controller 209 may be receptive to one or more sensors 211 for determining how to control the valve 208. The sensor 211 may be any of a variety of sensors, for example a temperature sensor (e.g., thermal coupler), an airflow sensor (e.g., mass air flow meter), or an engine speed sensor. The sensor 211 may alternatively be a timer or timing circuit. In one embodiment, the controller 209 may incorporate a memory. In an alternative embodiment, no controller and/or sensor may be needed for controlling, switching, changing, or setting the configuration of the valve 208.

When in the open configuration, boosted air output from the compressor 210 is allowed to flow or transmit along the supplementary exhaust path 226 and through the catalyst 204 without traveling first through the engine 202 for combustion. When in the closed configuration, boosted air output from the compressor 210 will flow to the engine 202 for combustion and is prevented from flowing or transmitting along the supplementary exhaust path 226. The open configuration may be adapted to allow varying flow-rates through the valve 208. For example, the open configuration may be fully open such that all boosted air leaving the compressor 210 flows along the supplementary exhaust path 226 and no boosted air flows to the engine 202. Alternatively, the open configuration may allow some of the boosted air leaving the compressor 210 to flow along the supplementary exhaust path 226 and some of the boosted air leaving the compressor 210 to flow along the intake path 220. Thus, the flow rate of boosted air transmitted through the valve 208 and along the supplementary exhaust path 226 may be controlled, for example, linearly. Moreover, the open configuration of the valve 208 may be controlled so as to regulate the flow of the boosted air based on a pressure of the boosted air. In an alternative embodiment, more than one valve 208 may be used for controlling the flow of the boosted air to the engine 202 or to the catalyst 204.

In operation, for example, upon start-up the vehicle when the engine 202 is turned on, the engine 202 outputs exhaust gas along the first exhaust path 222 to the turbine 212 of the turbocharger unit. By spinning the turbine 212, the compressor 210 is powered and compresses or boosts air received from the engine intake air box 206. The turbocharger unit may thus be operating when the engine 202 is at idle. The turbocharger unit and/or components of the engine 202 may be configured to allow for quick spool-up of the turbocharger unit or to create increased exhaust flow even at low engine speeds such as idle, for example, by allowing a waste gate of the turbocharger unit to close even when the engine 202 is not requesting torque from the throttle or by adjusting a spark return of the engine 202. The valve 208 is set to the open configuration by the controller 209 and at least a portion of the boosted air output from the compressor 210 is transmitted along the supplementary exhaust path 226. This portion of the boosted air merges with exhaust gas that passed through the turbine 212, and is transmitted to the catalyst 204. The valve 208 remains in the open configuration for a period of time sufficient to warm-up the catalyst 204 for reducing excess fuel or toxic elements of the exhaust gas to satisfactory levels, for example, 20 seconds after vehicle start-up, to accommodate the exhaust gas which tends to be rich for idle stability of the engine 202.

After the catalyst 204 has been sufficiently warmed, the controller 209 commands or otherwise controls the valve 208 to switch or change to the closed configuration. When in the closed configuration, boosted air output from the compressor 210 of the turbocharger unit will instead flow completely or substantially to the engine 202 along the intake path 220 and not along the supplementary exhaust path 226. The valve 208 may be switched to the open configuration or the closed configuration at any time by the controller 209 when it is determined that the catalyst 204 would more efficiently reduce the emissions of the engine 202 if provided with supplementary air injection.

Figure 3:
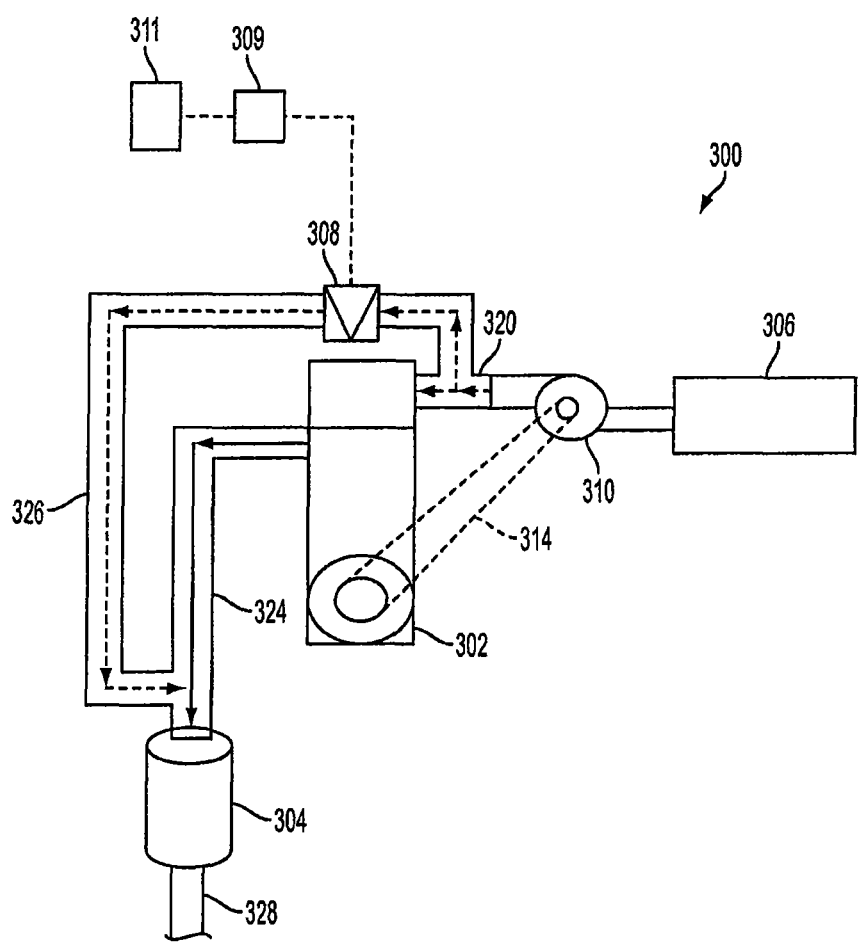
FIG. 3 is a system diagram of supercharger boost extraction for secondary air injection according to an embodiment of the present invention.

Referring now to FIG. 3, a system diagram 300 is shown for extracting boosted air from a supercharger unit for warming up a vehicle catalyst system in order to more efficiently reduce the engine emissions. Generally, the system diagram 300 may have certain structural and functional features that are the same or similar to those of the system diagram 200 described above for FIG. 2. Notwithstanding these similar features, the system diagram 300 may be distinguished from the system diagram 200 based primarily on the operation of a belt or gear driven air compression device instead of a turbine driven air compression device.

The system diagram 300 includes an engine 302, and a supercharger unit comprising a compressor 310 and a mechanical link 314. The engine 302 is connected with the compressor 310 of the supercharger unit via the mechanical link 314. The mechanical link may be a belt or a gear or any other type of connection such that the compressor 310 may be powered by a rotating or moving portion or component of the engine 302. After the combustion stroke in the engine 302, waste or exhaust gas is output from the engine 302 through or along a first exhaust path 324 to a catalyst 304 for the removal of toxic chemicals or other particulates in the waste or exhaust gas before the waste or exhaust gas is expelled away from a vehicle. As discussed above for FIG. 2, the catalyst 304 may operate more efficiently at warmer temperatures. Thus, secondary air injection from the boosted air exiting the compressor 310 of the supercharger unit is transmitted to the catalyst 304, as described in greater detail below. After passing through the catalyst 304, the waste or exhaust gas is transmitted along a third exhaust path 328 where it may be expelled away from the vehicle with significantly reduced engine emissions.

An engine intake air box 306 is connected to the compressor 310 of the supercharger unit and provides a source of air to the compressor 310 to be compressed or boosted. Once compressed by the compressor 310, the boosted air from the engine intake air box 306 may be sent to the engine 302 along an intake path 320 and may provide the engine 302 with increased power generation capabilities when compared to a supply of non-boosted air. Similar to the discussion above for FIG. 2, the boosted air output from the compressor 310 may be routed not only to the engine 302, but instead or additionally to the catalyst 304 via a supplementary exhaust path 326 in order to aid in the warm-up of the catalyst 304 for more efficient engine emissions reduction. The supplementary exhaust path 326 may be routed near portions of the vehicle or engine bay that generate heat (e.g., adjacent the engine 302) in order to increase the temperature of air flowing through the supplementary exhaust path 326 to further aid in warm-up of the catalyst 304.

A valve 308 is positioned at a location along or connected to the intake path 320 of the boosted air stream. The valve 308 may have an open configuration and a closed configuration. A controller 309 is connected to the valve 308, either via a wired connection or wirelessly, for controlling the configuration of the valve 308, as discussed in more detail herein and/or by the flowcharts shown in FIGS. 4A-5. Alternative control logic may be utilized by the controller 309 in an alternative embodiment, for example, the configuration of the valve 308 may be time-based or manually set. Similar to the controller 209 discussed above for FIG. 2, the controller 309 may be any type of hardware capable of controlling the valve 308, including an engine control unit of the vehicle. The controller 309 may be receptive to one or more sensors 311, the same or similar to the sensors 211 discussed above for FIG. 2. The controller 309 may also incorporate a memory. In an alternative embodiment, no controller may be needed for controlling, switching, changing, or setting the configuration of the valve 308.

When in the open configuration, boosted air output from the compressor 310 may flow along the supplementary exhaust path 326 and into the catalyst 304 without traveling first through the engine 302 for combustion. When in the closed configuration, boosted air output from the compressor 310 will flow to the engine 302 for combustion, but is not permitted to flow along the supplementary exhaust path 326. The open configuration may be adapted to allow varying flow-rates (e.g., linearly) through the valve 308. For example, the open configuration may be fully open such that all boosted air leaving the compressor 310 flows along the supplementary exhaust path 326 and no boosted air flows to the engine 302. Alternatively, the open configuration may allow a portion of the boosted air leaving the compressor 310 to flow along the supplementary exhaust path 326 to the catalyst 304 and a portion of the boosted air leaving the compressor 310 to flow along the intake path 320 to the engine 302. Moreover, the open configuration of the valve 308 may be controlled so as to regulate the flow of the boosted air based on a pressure of the boosted air. In an alternative embodiment, more than one valve 308 may be used for controlling the flow of the boosted air to the engine 302 or to the catalyst 304.

In operation, the system diagram 300 may operate similar to the system diagram 200 as discussed above for FIG. 2. For example, upon start-up the vehicle by turning on the engine 302, the rotating or moving parts of the engine 302 provide power to the compressor 310 of the supercharger unit via the mechanical link 314. Air received from the engine intake air box 306 is boosted or compressed by the compressor 310. The supercharger unit may thus be operating when the engine 302 is at idle. In an alternative embodiment, a clutching/declutching component may be used to prevent operation of the compressor 310 when the engine 302 is at idle, for example, if the catalyst 304 does not need supplementary air injection from the compressor 310. The valve 308 is set to the open configuration by the controller 309 and at least a portion of the boosted air output from the compressor 310 is transmitted along the supplementary exhaust path 326, merges with waste or exhaust gas exiting the engine 302, and travels to the catalyst 304. The valve 308 remains in the open configuration for a period of time sufficient to adequately warm-up the catalyst 304 for the reduction of toxic elements in the exhaust gas to satisfactory levels, for example, 20 seconds after vehicle start-up, to accommodate the exhaust gas which tends to be rich for idle stability of the engine 302.

After the engine emissions have been suitably reduced, the controller 309 commands or otherwise controls the valve 308 to switch or change to the closed configuration. When in the closed configuration, boosted air output from the compressor 310 of the supercharger unit will instead flow completely or substantially to the engine 302 along the intake path 320 and not along or through the supplementary exhaust path 326. The valve 308 may be switched to the open configuration or the closed configuration at any time by the controller 309 when it is determined that the catalyst 304 would more efficiently reduce the emissions of the engine 202 if provided with supplementary air injection.

Figure 4A:
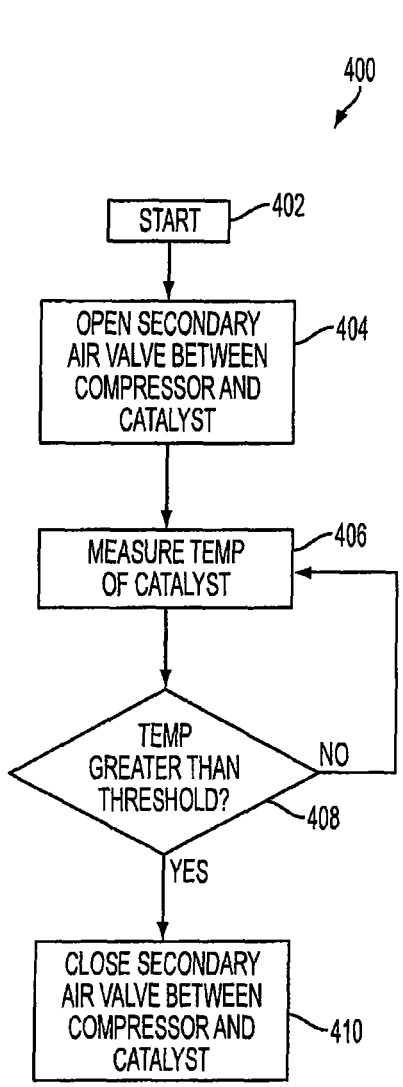
FIG. 4A is a flowchart of boost extraction for secondary air injection based upon a sensing of temperature according to an embodiment of the present invention.
Figure 4B:
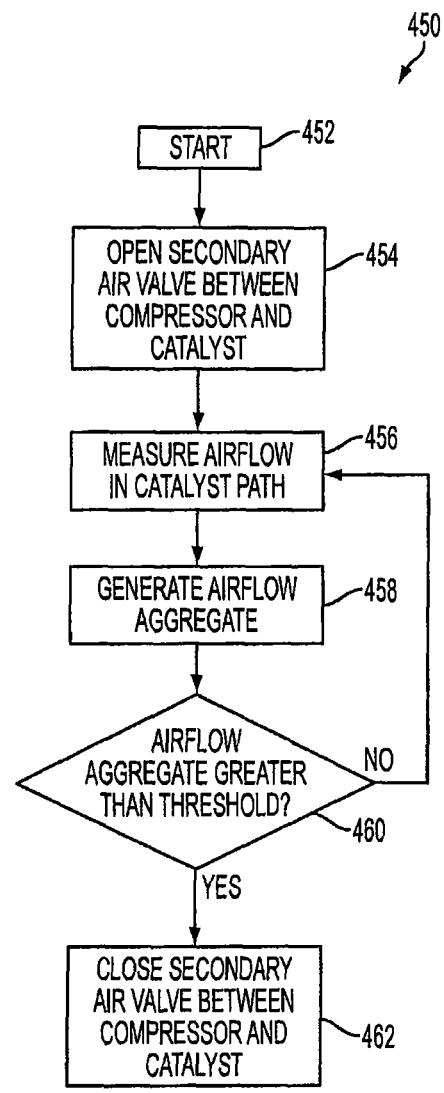
FIG. 4B is a flowchart of boost extraction for secondary air injection based upon a sensing of airflow according to an embodiment of the present invention.

Turning next to FIGS. 4A-4B, flowcharts showing exemplary embodiments for controlling an emissions control system with secondary air injection and responsive to sensor inputs are described. FIG. 4A depicts a method 400 for controlling secondary air injection from a compressor to a catalyst of an automobile based upon a sensed temperature of the catalyst. In step 402 the method starts, such as during start-up of a vehicle when the engine is turned on, or it is otherwise determined that secondary air injection to the catalyst is desired. In step 404, a secondary air valve is opened to allow air from the compressor of the automobile to flow directly to the catalyst. In step 406, a sensor measures, senses, or otherwise determines the temperature of the catalyst. The sensor may be a thermal coupler or, alternatively, any other type of sensor capable of determining temperature. The temperature determined by the sensor may be an instantaneous temperature or may be a form of aggregate temperature, such as an average temperature of the catalyst over a predetermined period of time. In step 408, the temperature determined by the sensor is compared against a predetermined threshold value. If the temperature determined by the sensor is not greater than the threshold value, operation returns to step 406 where the sensor again determines the temperature of the catalyst. A time-delay between sensor measurements may be employed. If the temperature determined by the sensor is greater than the threshold value, operation continues to step 410. In step 410, the secondary air valve is closed so that air from the compressor of the automobile is not permitted to flow directly to the catalyst.

In another embodiment, FIG. 4B depicts a method 450 for controlling secondary air injection from a compressor to a catalyst of an automobile based upon a sensed airflow to or through the catalyst. In step 452 the method starts, such as when a vehicle is turned on, or it is otherwise determined that secondary air injection to the catalyst is desired. In step 454, a secondary air valve is opened to allow air from the compressor of the automobile to flow directly to the catalyst. In step 456, a sensor measures, senses, or otherwise determines an instantaneous airflow to or through the catalyst. The airflow may be measured at any location along the compressor-to-catalyst path, for example at the output of the compressor or at the location of the secondary air valve. The instantaneous airflow may be the entire flow of air passing through the catalyst or may be only the flow of compressed air from the compressor. The sensor may be a mass air flow meter or, alternatively, any other type of sensor capable of determining airflow. In step 458, an aggregate airflow value is generated or updated based upon one or more instantaneous airflow measurements from the sensor, for example, by summing a plurality of instantaneous airflow measurements. In step 460, the aggregate airflow value is compared against a predetermined threshold value. If the aggregate airflow value is not greater than the threshold value, operation returns to steps 456 and 458 where the sensor again determines the instantaneous airflow of the secondary air injection and updates the aggregate airflow value. If the aggregate airflow value is greater than the threshold value, operation continues to step 462. In step 462, the secondary air valve is closed so that air from the compressor of the automobile is no longer permitted to flow directly to the catalyst. In an alternative embodiment, no aggregate airflow value may be needed; instead the secondary air valve remaining open for a predetermined amount of time based upon an instantaneous airflow measurement from the sensor, for example, by assuming the airflow measurement remains stable when the secondary air valve is open.

Figure 5:
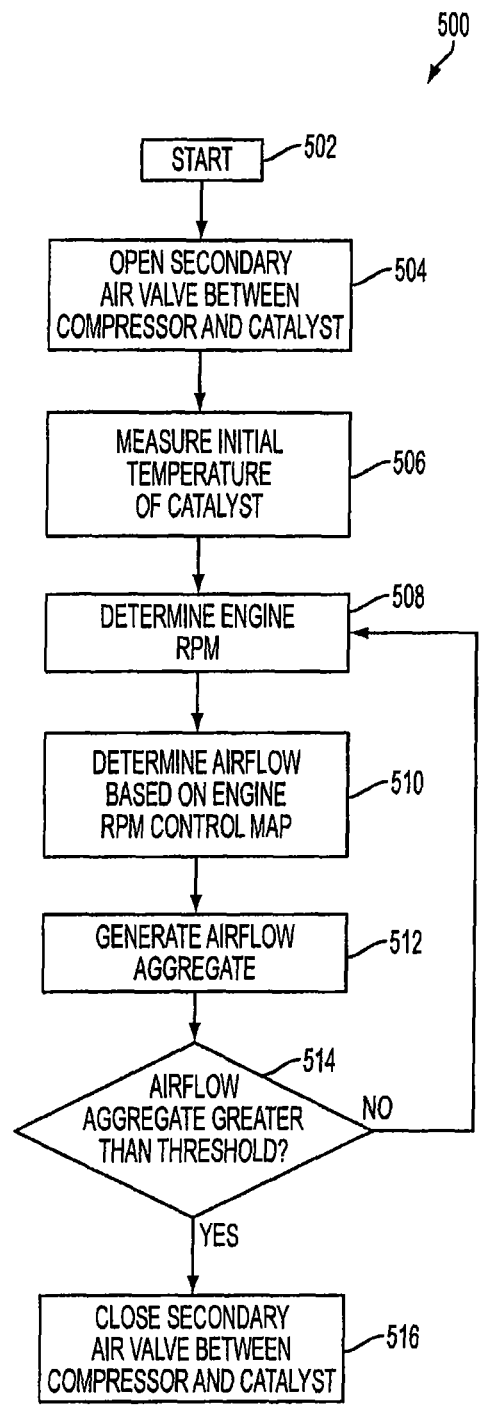
FIG. 5 is a flowchart of boost extraction for secondary air injection based upon an engine rpm/airflow control map according to an embodiment of the present invention.

Turning next to FIG. 5, a flowchart is shown depicting a method 500 for controlling secondary air injection from a compressor to a catalyst of an automobile based upon a control map stored in a memory of the automobile. The control map includes a plurality of engine speed values and a plurality of corresponding airflow values. In step 502 the method starts, such as when a vehicle is turned on, or it is otherwise determined that secondary air injection to the catalyst is desired. In step 504, a secondary air valve is opened to allow air from the compressor of the automobile to flow directly to the catalyst. In step 506, an initial temperature of the catalyst is measured by a sensor (e.g., a thermal coupler). In an alternative embodiment, the initial temperature may be obtained by a predetermined default value rather than measured by a sensor. In step 508, an instantaneous engine speed (e.g., engine RPM) is measured or otherwise determined. In step 510, an airflow value is determined by looking up or comparing the instantaneous engine speed determined in step 508 to the engine speed values stored in the control map and obtaining the corresponding airflow value for that engine speed value. For example, the control map may comprise a corresponding predetermined airflow value for a predetermined engine speed value. The airflow value for each engine speed value may originally be set in the control map according to testing data. If the instantaneous engine speed does not exactly match an engine speed value stored in the control map, the closest engine speed value may be used. In an alternative embodiment, interpolation may be used for a more accurate estimation of airflow when there is not an exact match of engine speed.

In step 512, an aggregate airflow value is generated or updated based upon the previous airflow values obtained from the control map in step 510. In step 514, the aggregate airflow value is compared against a predetermined threshold value. The predetermined threshold value may be set according to the measured initial temperature of the catalyst, such that upon knowing the initial temperature of the catalyst, a predetermined amount of airflow is desired to effectively warm-up the catalyst to a desired temperature. If the aggregate airflow value is not greater than the threshold value, operation returns to step 508 where the instantaneous engine speed is determined again. If the aggregate airflow value is greater than the threshold value, operation continues to step 516. In step 516, the secondary air valve is closed so that air from the compressor of the automobile is no longer permitted to flow directly to the catalyst. In an alternative embodiment, no aggregate airflow value may be needed, instead the secondary air valve remaining open for a predetermined amount of time based upon the measured initial temperature and an airflow value obtained from the control map, for example, by assuming the airflow obtained remains stable when the secondary air valve is open.

In an alternative embodiment, other control methods may be used for controlling the opening and/or closing of a secondary air valve for a secondary air injection emissions control system. For example, control of the secondary air valve may be based upon a predetermined amount of time rather than relying on temperature or airflow measurements from one or more sensors. In another example, the secondary air valve may be open only if the compressor is outputting boosted air above a certain pressure (e.g., a pressure greater than the amount of pressure desired for engine performance).

In addition, sensors other than temperature or airflow sensors may be used in a similar fashion in replacement of or in addition to those discussed above. For example, a pressure sensor may be utilized to determine the pressure of the boosted air output from the compressor, the pressure of the boosted air used to determine an airflow value or other parameter of the secondary air injection system. Moreover, control maps, the same or similar to that discussed for FIG. 5, may be used for any of these alternative control methods.

Those of ordinary skill would appreciate that the various illustrative logical blocks, modules, and algorithm steps described in connection with the examples disclosed herein may be implemented as electronic hardware, computer software, or combinations of both. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An air injection system for a vehicle comprising:
   an engine having a fluid input end and a fluid output end capable of outputting an exhaust fluid, the engine being configured to provide an output torque;
   an air intake device configured to output an airflow;
   a rotatable mechanical connection coupled with the engine and having at least one of a belt or a gear;
   a supercharger including a compressor mechanically coupled with the rotatable mechanical connection for receiving the output torque of the engine, the compressor having a fluid input end for receiving the airflow outputted by the air intake device and a fluid output end for outputting compressed air;
   a first fluid path having a fluid input end coupled with the fluid output end of the compressor and a fluid output end coupled with the fluid input end of the engine;
   a second fluid path coupled with the fluid output end of the engine for transferring the exhaust fluid outputted by the engine;

a catalyst coupled with the second fluid path and configured to receive the exhaust fluid from the second fluid path;

a supplementary fluid path coupled with the first fluid path and the second fluid path, at least a portion of the supplementary fluid path being positioned adjacent to the engine and configured to receive heat generated from the engine for warming up the catalyst;

a valve for controlling a fluid flow of the supplementary fluid path, the valve having a first configuration for allowing transmittal of at least some of the compressed air outputted by the compressor to the catalyst via the supplementary fluid path for warming up the catalyst using at least some of the compressed air outputted by the compressor to the catalyst via the supplementary fluid path and a second configuration for preventing transmittal of the compressed air outputted by the compressor to the catalyst via the supplementary fluid path;

a first sensor positioned at a location downstream from the compressor for detecting a flow rate of at least some of the compressed air outputted by the compressor to the catalyst via the supplementary fluid path;

a second sensor configured to detect a temperature value of the catalyst; and a controller coupled with the first sensor, the second sensor, and the valve and configured to control the valve to be in the first configuration or the second configuration based on the detected flow rate of the least some of the compressed air outputted by the compressor to the catalyst via the supplementary fluid path and the detected temperature value.

2. The air injection system of claim 1 wherein the first configuration of the valve is configured to transmit all of the compressed air outputted by the compressor to the catalyst via the supplementary fluid path.

3. The secondary air injection system of claim 1 wherein the controller is an Engine Control Unit (ECU) of the vehicle.

4. The air injection system of claim 1 wherein the controller is configured to switch the valve from the first configuration to the second configuration when an aggregate flow rate is greater than a predetermined threshold, the aggregate flow rate being based upon the detected flow rate of the at least some of the compressed air outputted by the compressor to the catalyst via the supplementary fluid path.

5. The air injection system of claim 1 further comprising a control map for storing an engine speed value and a corresponding flow rate value, wherein the controller is further configured to switch the valve from the first configuration to the second configuration based upon the corresponding flow rate value of the control map.

6. The air injection system of claim 1 wherein the controller controls the valve to the first configuration when the engine is turned on during start-up of the vehicle.

7. An automobile comprising:
an engine having a fluid input end and a fluid output end capable of outputting an exhaust fluid, the engine being configured to provide an output torque;
an air intake box configured to output an airflow;
a rotatable mechanical connection coupled with the engine and having at least one of a belt or a gear;
a supercharger including a compressor mechanically coupled with the rotatable mechanical connection for receiving the output torque of the engine, the compressor having a fluid input end for receiving the airflow outputted by the air intake box and a fluid output end for outputting compressed air;

a first fluid path having a fluid input end coupled with the fluid output end of the compressor and a fluid output end coupled with the fluid input end of the engine;

a second fluid path coupled with the fluid output end of the engine for transferring the exhaust fluid outputted by the engine;

a catalyst coupled with the second fluid path and configured to receive the exhaust fluid from the second fluid path;

a supplementary fluid path coupled with the first fluid path and the second fluid path, at least a portion of the supplementary fluid path being positioned adjacent to the engine and configured to receive heat generated from the engine for warming up the catalyst;

a valve for controlling a fluid flow of the supplementary fluid path, the valve having an open configuration for allowing transmittal of at least some of the compressed air outputted by the compressor to the catalyst via the supplementary fluid path for warming up the catalyst directly using at least some of the compressed air outputted by the compressor to the catalyst via the supplementary fluid path and a closed configuration for preventing transmittal of the compressed air outputted by the compressor to the catalyst via the supplementary fluid path;

a first sensor positioned at a location downstream from the compressor for detecting a flow rate of at least some of the compressed air outputted by the compressor to the catalyst via the supplementary fluid path;

a second sensor configured to detect a temperature value of the catalyst; and a controller coupled with the first sensor, the second sensor and the valve, the controller configured to switch the valve between the open configuration and the closed configuration based on the detected flow rate of the at least some of the compressed air outputted by the compressor to the catalyst and the detected temperature value.

8. The automobile of claim 7 wherein the compressor comprises a housing and at least a part of the valve is positioned within the housing.

9. The automobile of claim 7 wherein the controller is configured to switch the valve from the open configuration to the closed configuration when an aggregate flow rate is greater than a predetermined threshold, the aggregate flow rate being based upon the detected flow rate of the at least some of the compressed air outputted by the compressor to the catalyst via the supplementary fluid path.

10. The automobile of claim 7 wherein the controller is configured to switch the valve from the open configuration to the closed configuration after a predetermined amount of time.

11. The automobile of claim 7 further comprising a control map for storing a plurality of engine speed values and a plurality of corresponding airflow values, the controller configured to switch the valve from the open configuration to the closed configuration based upon one or more corresponding airflow values obtained from the control map.

12. A method of air injection for emission control of an automobile having an engine having a fluid input end and a fluid output end capable of outputting an exhaust fluid, the method comprising the steps of:
providing an air intake device configured to output an airflow;
providing a rotatable mechanical connection coupled with the engine;

providing a supercharger including a compressor mechanically coupled with the rotatable mechanical connection for receiving an output torque of the engine, the compressor having a fluid input end for receiving the airflow outputted by the air intake device and a fluid output end;

providing a first fluid path having a fluid input end coupled with the fluid output end of the compressor and a fluid output end coupled with the fluid input end of the engine;

providing a second fluid path coupled with the fluid output end of the engine;

providing a catalyst coupled with the second fluid path;

providing a supplementary fluid path coupled with the first fluid path and the second fluid path, at least a portion of the supplementary fluid path being positioned adjacent to the engine and configured to receive heat generated from the engine for warming up the catalyst;

providing a valve for controlling a fluid flow of the supplementary fluid path;

providing a first sensor at a location downstream from the compressor;

providing a second sensor configured to detect a temperature value of the catalyst;

providing a controller coupled with the first sensor, the second sensor, and the valve;

outputting, by the engine, an exhaust fluid;

transferring, via the second fluid path, the exhaust fluid outputted by the engine to the catalyst;

outputting, using the fluid output end of the compressor, compressed air;

opening the valve for allowing transmittal of at least some of the compressed air outputted by the compressor to the catalyst via the supplementary fluid path for warming up the catalyst directly using at least some of the compressed air;

determining, using the first sensor, a flow rate of the transmittal of the at least some of the compressed air outputted by the compressor to the catalyst via the supplementary fluid path; and closing, using the controller, the valve for preventing transmittal of the compressed air outputted by the compressor to the catalyst via the supplementary fluid path, based on the detected temperature value and the flow rate of the transmittal of the at least some of the compressed air outputted by the compressor to the catalyst.

13. The method of claim 12 wherein the step of determining, using the first sensor, the flow rate of the transmittal of the at least some of the compressed air outputted by the compressor to the catalyst via the supplementary fluid path comprises the steps of:

detecting, using the first sensor, a first instantaneous flow of the at least some of the compressed air outputted by the compressor to the catalyst via the supplementary fluid path;

detecting, using the first sensor, a second instantaneous flow of the at least some of the compressed air outputted by the compressor to the catalyst via the supplementary fluid path; and summing the first instantaneous flow of air and the second instantaneous flow of air.

14. The method of claim 12 further comprising the steps of:

detecting, using the second sensor, an initial temperature of the catalyst;

detecting a first engine speed of the engine;

determining a calculated flow rate of the at least some of the compressed air outputted by the compressor to the catalyst via the supplementary fluid path via looking up the first engine speed in a control map and obtaining a first corresponding airflow value; and closing, using the controller, the valve for preventing transmittal of the compressed air outputted by the compressor to the catalyst via the supplementary fluid path after a predetermined amount of time, the predetermined amount of time based upon the initial temperature and the calculated flow rate of the transmittal of the at least some of the compressed air outputted by the compressor to the catalyst via the supplementary fluid path.

15. The method of claim 12 further comprising the steps of:

detecting, using the second sensor, an initial temperature of the catalyst;

detecting a first engine speed of the engine;

detecting a second engine speed of the engine; and determining a calculated flow rate of the transmittal of the at least some of the compressed air outputted by the compressor to the catalyst via the supplementary fluid path by:

looking up the first engine speed in a control map and obtaining a first corresponding airflow value, looking up the second engine speed in the control map and obtaining a second corresponding airflow value and summing the first corresponding airflow value and the second corresponding airflow value.

* * * * *